United States Patent Office 2,741,628
Patented Apr. 10, 1956

2,741,628

SEPARATION OF HAFNIUM AND ZIRCONIUM SALTS

William K. Plucknett, Tuckahoe, N. Y., assignor to the United States of America as represented by the United States Atomic Energy Commission No Drawing. Application September 14, 1951, Serial No. 246,721

9 Claims. (Cl. 260—429.3)

This invention deals with the separation of hafnium and zirconium salts contained in mixture in aqueous solutions.

It is an object of this invention to provide a process for an efficient separation of zirconium and hafnium salts from aqueous solutions in a simple and inexpensive manner.

It is another object of this invention to provide a process for the recovery, each in a high degree of purity, of hafnium and zirconium salts contained in aqueous solutions.

It is another object of this invention to provide a process for obtaining zirconium salts in a higher concentration than they were originally present when admixed with hafnium salts in aqueous solutions.

Zirconium and hafnium are usually associated in naturally occurring zirconium ores. Both elements have similar chemical properties which makes their separation rather difficult. Moreover, hafnium usually occurs in relatively small quantities; for instance, zircon sand contains approximately 2.5% by weight of hafnium with regard to the zirconium content present and zirkite, also an American ore, contains only about 0.8% of hafnium.

It has been found by the inventor after comprehensive research work that salicylic acids appear to form a stronger complex with zirconium salts than with hafnium salts.

The process of this invention is based on this finding; it comprises contacting an aqueous solution containing both zirconium and hafnium salts with a salicylic acid dissolved in a substantially water-immiscible oxygen-containing organic solvent in which the uncomplexed zirconium and hafnium salts are insoluble whereby a zirconium salt complex is formed and preferentially taken up by an organic phase, and then separating said organic phase from the remaining aqueous solution.

The process is applicable to various kinds of zirconium and hafnium salts, such as oxychlorides and oxynitrates. The concentration of the salts is not critical.

As the complexing agent, not only ortho-salicylic acid or ortho-hydroxy benzoic acid is suitable, but alkyl-, halogen- and aroyl-substituted salicylic acids are also satisfactory. Wide ranges of concentrations with regard to the salicylic acids are usable. A molal ratio of the salicylic acid:zirconium ranging from about 1:1 to 6:1 is suitable; however, a range of from 2:1 to 6:1 is preferred.

As has been mentioned above, the solvent for the salicylic acid has to be an organic substance in which this complexing agent is easily soluble. Moreover, it must not be a solvent for the noncomplexed zirconium and hafnium salts, and it finally also has to be substantially water-immiscible. Oxygen-containing organic solvents, such as benzyl alcohol, n-amyl-alcohol, isoamyl alcohol and nitrobenzene answer the specifications given above.

In the following, an example of the process of this invention is given for illustrative purposes only without the intention to limit the scope of the invention to the details given therein.

*Example*

An aqueous solution containing zirconium oxychloride and 1.8% (with regard to the zirconium content) of hafnium oxychloride in a total concentration of 0.7 M was shaken with an equal volume of a 2.0 M solution of salicylic acid in benzyl alcohol. The alcoholic phase when analyzed, after separation, showed that 57% of the zirconium salt originally present in the aqueous solution had been extracted into the alcohol; the hafnium content of the solvent-extracted zirconium was less than half of the concentration in the original aqueous solution.

A higher degree of separation, of course, may be achieved by repetition of the complexing and extraction cycle or by carrying out the process in a continuous manner, for instance in an extraction column where several theoretical extraction stages are applied. The ratio of salicylic acid:zirconuim was found to affect the efficiency of the process in two ways:

1. Percentage of total solids present which is extracted into the organic phase.
2. Percentage zirconium enrichment of the material extracted into the organic phase.

In selecting a range of molal ratios to obtain a desired efficiency it should be borne in mind that the increase in molal ratio tends to increase the percentage of total solids extracted into the organic phase, becoming a maximum at 8:1 where all of the solids are extracted into the organic phase, but that the percentage zirconium enrichment of the extracted material changes with change of molal ratio and at a molal ratio of 8:1, the percentage zirconium enrichment is minimal.

It will be understood that this invention is not to be limited to the details given herein but that it may be modified within the scope of the appended claims.

What is claimed is:

1. A process of separating zirconium salt from hafnium salt contained in mixture in an aqueous solution, said salts being selected from the group consisting of oxychlorides and oxynitrates, comprising contacting said solution with a salicylic acid dissolved in a substantially water-immiscible oxygen-containing inert organic solvent selected from the group consisting of alcohols and nitrobenzene in which said salts are insoluble whereby said zirconium salt is complexed by said salicylic acid and the zirconium complex formed is preferentially taken up by an organic phase, and separating said organic phase from said aqueous solution.

2. The process of claim 1 wherein the zirconium salt is zirconium oxychloride and the hafnium salt is hafnium oxychloride.

3. The process of claim 1 wherein the complexing agent is ortho-hydroxy benzoic acid.

4. The process of claim 1 wherein the solvent is benzyl alcohol.

5. The process of claim 1 wherein the solvent is n-amyl alcohol.

6. The process of claim 1 wherein the solvent is isoamyl alcohol.

7. The process of claim 1 wherein the solvent is nitrobenzene.

8. The process of claim 1 wherein the salicylic acid is present in a quantity corresponding to a molal ratio for said salicylic acid:zirconium of approximately from 1:1 to 6:1.

9. The process of claim 8 wherein the ratio ranges from 2:1 to 6:1.

(References on following page)

References Cited in the file of this patent

UNITED STATES PATENTS

| | | |
|---|---|---|
| 1,646,128 | Van Schaack | Oct. 18, 1927 |
| 2,566,665 | Huffman et al. | Sept. 4, 1951 |

FOREIGN PATENTS

| | | |
|---|---|---|
| 237,624 | Germany | June 5, 1910 |

OTHER REFERENCES

Venable et al.: Jour. Amer. Chem. Soc., vol. 40 (1918), pages 1746–1748.

Hevesy et al.: Ber. der Deu. Chem., vol. 59 (1921).

Tingle: Beilstein Handbook Org. Chem., vol. 10, page 76.

Volwiler et al.: Chem. Abs., vol. 16 (1922), page 79.

Desai et al.: Chem. Abstract, vol. 30 (1936) page 4069.

Hackh's Chem. Dictionary, Grant (3rd Ed., The Blakiston Co., Philadelphia (1950), page 752.